A. N. PETTY.
ATTACHMENT FOR SCALES.
APPLICATION FILED APR. 9, 1912.

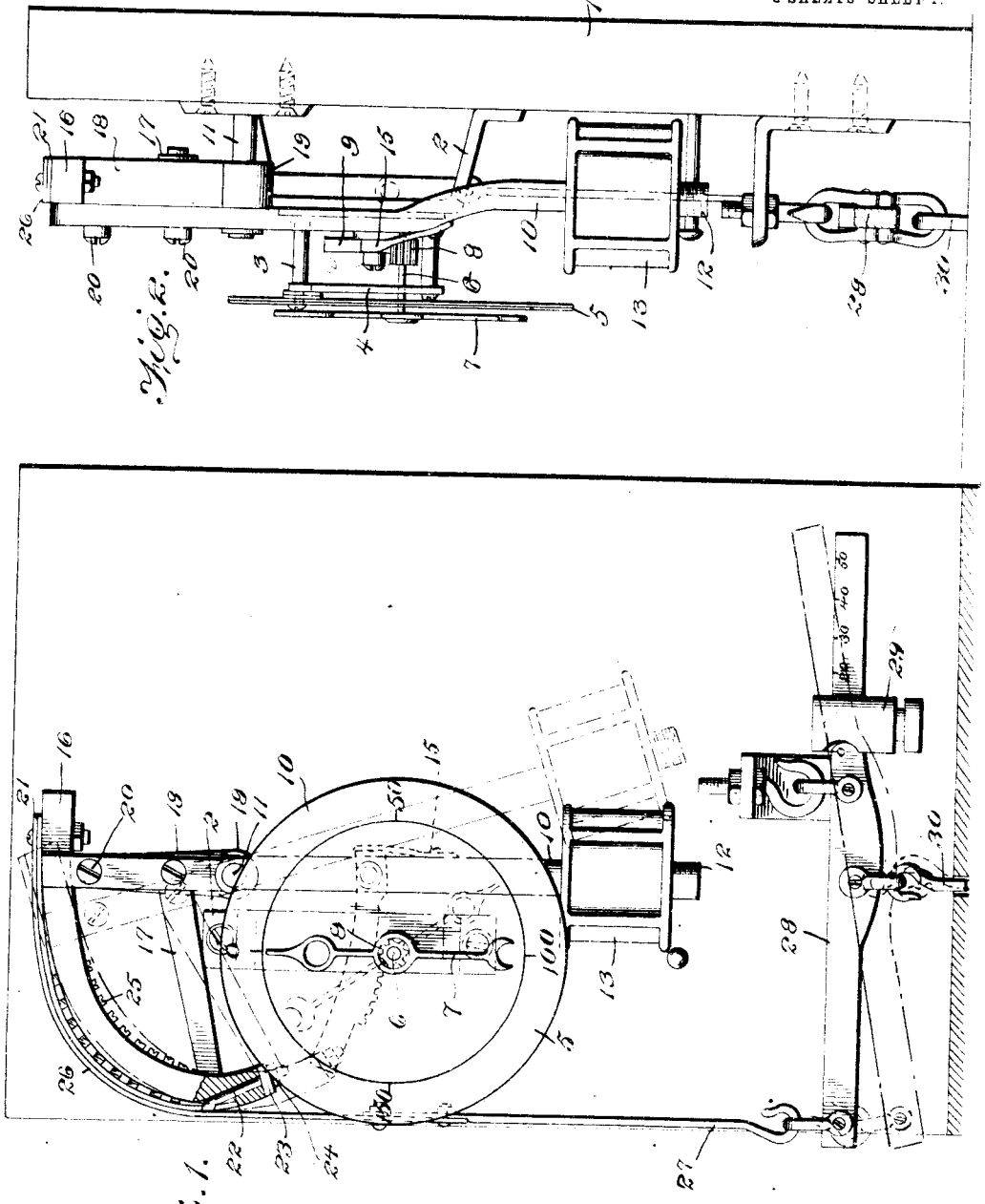

1,066,944.

Patented July 8, 1913.

2 SHEETS—SHEET 2.

Witnesses

Inventor
A. N. Petty
By
Attorneys

UNITED STATES PATENT OFFICE.

AMNER N. PETTY, OF CHICAGO, ILLINOIS, ASSIGNOR OF ONE-HALF TO HENRY C. ROSSMAN, OF CHICAGO, ILLINOIS.

ATTACHMENT FOR SCALES.

1,066,944.  Specification of Letters Patent.   Patented July 8, 1913.

Application filed April 9, 1912. Serial No. 689,500.

*To all whom it may concern:*

Be it known that I, AMNER N. PETTY, a citizen of the United States, residing at Chicago, in the county of Cook and State of Illinois, have invented certain new and useful Improvements in Attachments for Scales, of which the following is a specification.

This invention relates to weighing scales and has for its object the provision of a simple and accurate attachment whereby the weight of the article on the scales will be automatically indicated, and the use of a scale beam rendered unnecessary.

A secondary object of the invention is to provide a construction whereby the device may be easily adjusted to insure accuracy in the results indicated, and in which the parts will be few and arranged in a simple manner so that repairs will be facilitated.

The invention is illustrated in the accompanying drawings and will be hereinafter fully described, the novel features being subsequently pointed out in the claim following the description.

Figure 3:
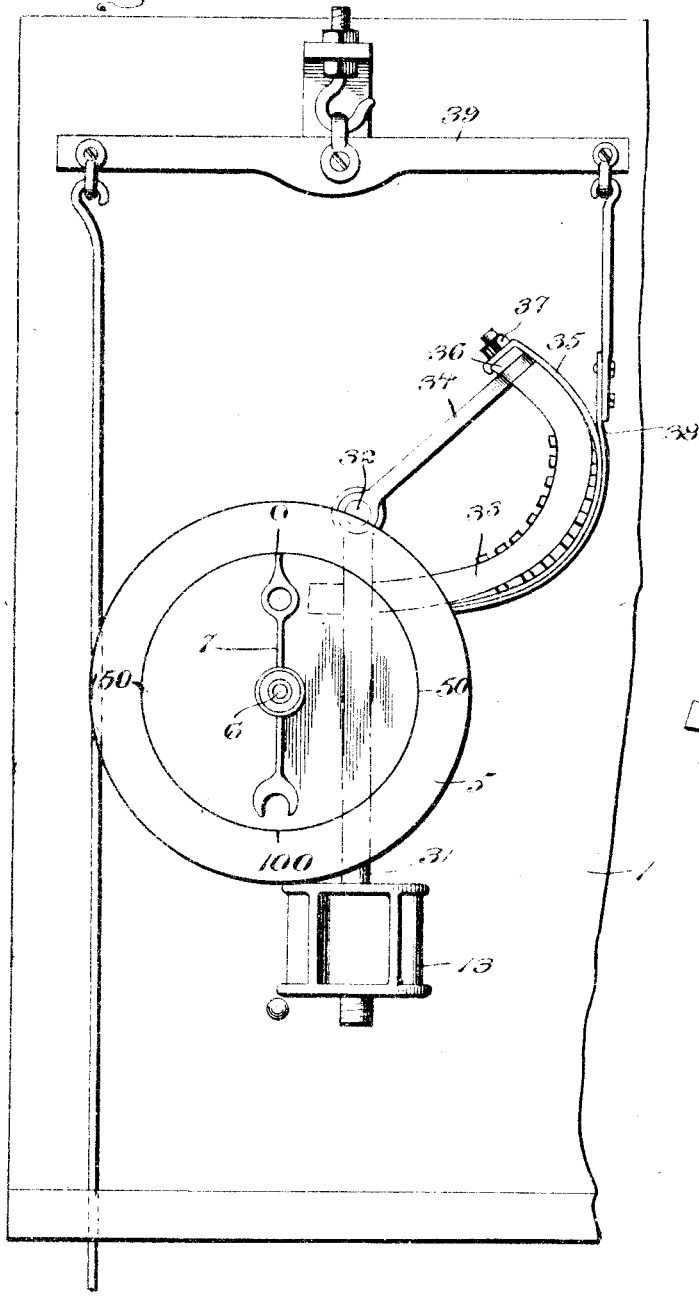
Figure 4:
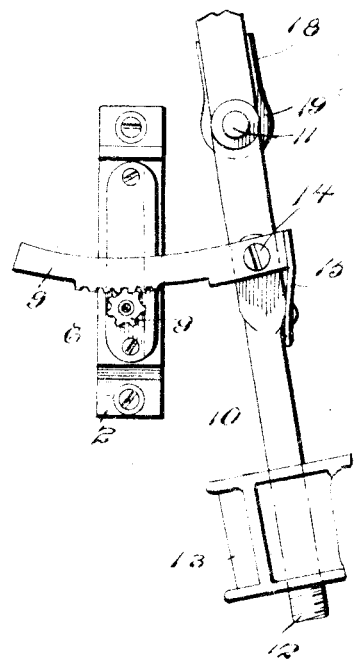

In the drawings:—Figure 1 is an elevation of my improved attachment; Fig. 2 is an end elevation. Fig. 3 is a front elevation of a modified form of the attachment; Fig. 4 is an enlarged detail view of the actuating rack bar and pinion.

In carrying out my invention, I secure to a fixed support, indicated at 1 as an upright board but which may be the back wall of a suitable casing, a bracket 2 from which project posts 3 at the upper and lower ends thereof, the forward ends of said posts being connected by a brace 4, and a dial 5 being secured thereto. An arbor 6 is journaled in the said bracket and the front brace and projects through the brace and the dial at the center of the dial and carries a pointer 7 on its front end which is adapted to play around the dial in the operation of the device. A pinion 8 is fixed upon the arbor 6 and is engaged by a rack bar 9 pivoted to a pendulum or lever 10 which, in the preferred form of the invention, is fulcrumed upon a post 11 projecting from the fixed support 1, as clearly shown. The lower portion of this pendulum or lever is threaded, as indicated at 12, and a weight 13 is mounted upon said lower threaded extremity so that it may be adjusted longitudinally of the same and thereby insure accuracy in the operation of the apparatus. The rack bar 9 is pivotally attached at one end to the lever or pendulum 10 below the fulcrum of the same, as shown at 14, and a spring 15 is secured to the lever or pendulum and bears upon the end of the rack bar to hold the same in mesh with the pinion, as will be readily understood. At the same time, the rack bar may be lifted out of mesh with the pinion whenever it is necessary to repair or clean the parts of the apparatus. The pendulum or lever is extended above its fulcrum post 11 and has its upper extended end rigidly secured to a cam or curved bar 16 which extends outwardly and downwardly and has its lower end braced by a strut 17, extending therefrom to the upper end of the lever. The cam bar may be secured directly to the lever, but is preferably provided with a depending arm or branch 18 which is provided with an eye 19 at its lower end to fit loosely around the fulcrum post 11 so as to be partly supported by the said post and thereby maintained in proper operative position, and the lever is secured to the said arm 18 by bolts or similar fastening devices 20. Upon the outer convex face of the cam bar 16, adjacent the end of the pendulum lever, I secure one end of a strap or band 21 which extends to the opposite end of the said bar where it is rigidly secured to an adjusting bolt 22 which extends through the end of the bar and is equipped with a washer 23 and a nut 24, whereby it may be secured firmly in place. A longitudinal series of set-screws 25 extend through the cam bar and bear against the inner face of this strap or band 21 whereby to adjust the curvature of the same to secure the necessary tension on the strap 26 which is secured to the upper end of the cam bar and extends over the band 21 in contact therewith and then is carried downwardly and equipped with a hook 27 adapted to be connected with one end of a lever 28 forming a part of the scale mechanism. This lever 28 is illustrated in Fig. 1 as equipped with a poise 29 so that the said lever may be utilized as a tare beam when it is desired to obtain the net weight of a load upon a truck or other vehicle.

It is thought the operation of the device will be readily understood. The article to be weighed is placed upon the scale platform in the usual manner and will at once transmit motion through the link 30 to the lever 28, so as to draw downwardly upon the strap 26 connected therewith, and the pull exerted upon said strap will be transmitted to the end of the cam bar 16 and the pendulum lever 10, so that the said bar and lever will swing about the fulcrum post 11 and thereby carry the pivoted end of the rack bar 9 away from the arbor 6, so as to rotate the pinion on said arbor and thereby actuate the said shaft and cause the pointer 7 to travel around the dial and stop in front of the numeral expressive of the weight on the scale. As soon as the article being weighed is removed from the scale, the weight 13 will return the parts to the initial normal position and bring the pointer back to zero.

In Fig. 3, I have shown a slight modification of the invention in which the pendulum lever 31 is fulcrumed at its upper extremity upon a post 32, and the cam bar 33 extends laterally from the lever at a point below the fulcrum and is curved upwardly, its upper end being connected with the upper extremity of the lever by a brace 34. The adjusting strap or spring band 35 has one end secured to the cam bar in the same manner in which the spring band 21 is secured to the cam bar in the previously described form, and the opposite end of the said band is carried through a projection 36 at the end of the cam bar and secured by nuts 37 bearing against the said projection. The strap 38 extending to the scale lever 39 passes upwardly over the cam bar, and the said lever is disposed above the same, as shown. This form of the invention will operate in the same manner as the previously described form, but is better adapted to some situations and some types of scales.

It will be understood that the attachment will be made in various sizes so that it may be readily applied to a scale of any size, and will expedite weighing as it will not be necessary to adjust a poise along a scale beam in order to ascertain the weight placed upon the scale. By means of the set-screws 25 and the weight 13, the device can be readily adjusted so as to insure extreme accuracy and in practice it has been found to be very sensitive. The apparatus is composed of few parts which are simple in their construction and arrangement, so that it can be easily cleaned or repaired whenever such attention is necessary.

Having thus described my invention, what I claim as new, is:—

An attachment for weighing scales, comprising a pivoted indicator, a pinion on the pivot of the indicator, a pendulum arranged near and at one side of the pivot, a rack bar secured at one end to the pendulum and extending laterally therefrom over and meshing with the pinion, a cam extending laterally from the pendulum above the rack bar and having one end rigid with the pendulum and braced between the pendulum and the opposite end of the cam, and a strap secured to and extending from the cam and connected with an actuating device.

In testimony whereof I affix my signature in presence of two witnesses.

AMNER N. PETTY. [L. S.]

Witnesses:
STELLA RYAN,
HYMAN S. FLAXMAN.